(12) United States Patent
Joubert

(10) Patent No.: US 6,758,131 B1
(45) Date of Patent: Jul. 6, 2004

(54) ADJUSTABLE COVER

(76) Inventor: Seun Joubert, 1970 Central Street, Prince George BC (CA), V2M 3C4

( * ) Notice: Subject to any disclaimer, the term of this patent is extended or adjusted under 35 U.S.C. 154(b) by 0 days.

(21) Appl. No.: 10/615,247

(22) Filed: Jul. 9, 2003

(51) Int. Cl.⁷ .......................... A47J 37/00; A47J 37/06; A47J 37/10; A47J 27/00; A47J 27/04
(52) U.S. Cl. .............................. 99/340; 99/403; 99/422; 99/645; 220/573.1; 220/912
(58) Field of Search .......................... 99/339, 340, 337, 99/338, 403–418, 422–425, 646 R, 645, 426; 126/369, 373.1; 220/573.1, 369, 287, 367.1, 832, 912; 215/311–313; D7/387, 391

(56) References Cited

U.S. PATENT DOCUMENTS

| | | | |
|---|---|---|---|
| 2,667,117 A | | 1/1954 | Millard et al. |
| 2,907,467 A | * | 10/1959 | Machate, Jr. ............... 210/469 |
| 4,138,939 A | | 2/1979 | Feld |
| 4,832,225 A | * | 5/1989 | Benjamin ................. 220/254.1 |
| 5,065,889 A | * | 11/1991 | Conti .......................... 220/360 |
| 5,193,524 A | * | 3/1993 | Loyd et al. ............... 126/374.1 |
| 5,555,994 A | * | 9/1996 | Chen .......................... 220/287 |
| 5,595,108 A | * | 1/1997 | Sheu ........................... 99/425 |
| D381,863 S | | 8/1997 | Vineis |
| 5,653,881 A | * | 8/1997 | Bruss et al. ................ 210/467 |
| 5,881,633 A | * | 3/1999 | Adams ......................... 99/341 |
| 6,035,766 A | * | 3/2000 | Schirmer ..................... 99/403 |
| 6,202,875 B1 | * | 3/2001 | Chang .................... 220/203.21 |
| 6,237,470 B1 | * | 5/2001 | Adams ......................... 99/422 |
| 6,273,285 B1 | * | 8/2001 | Chang .................... 220/203.05 |
| 6,536,603 B1 | * | 3/2003 | Sollo .......................... 210/469 |

* cited by examiner

Primary Examiner—Timothy F. Simone

(57) ABSTRACT

An adjustable cover has a variable outside diameter for fitting in pots and pans of variable sizes and also cover plates of variable sizes. The cover can be used for keeping food hot on plates, preventing splatter from pans when cooking and retaining moisture in the pan during cooking. The cover comprises a circular nonporous top member with a plurality of apertures adjacent to a peripheral rim of the top member, the apertures being evenly spaced apart in a ring concentric with the peripheral rim. Each of the apertures has a tongue projecting radially outwards therefrom. A plurality of nonporous substantially trapezoidal vanes extend down from the peripheral rim and are curved and circumferentially overlapping to form a dome like shape. Each of the vanes has a tab projecting upwards into one of the apertures and rests on the surface of the top member. The tab having a slot to engage the tongue in each of the apertures and hold the vanes to the top member in a circular overlapping ring arrangement and adjacent vanes contacting each other. The tongue and slot form a hinge for each of the vanes so they move up or down together retaining the circular overlapping arrangement to vary the outside diameter of the cover.

6 Claims, 7 Drawing Sheets

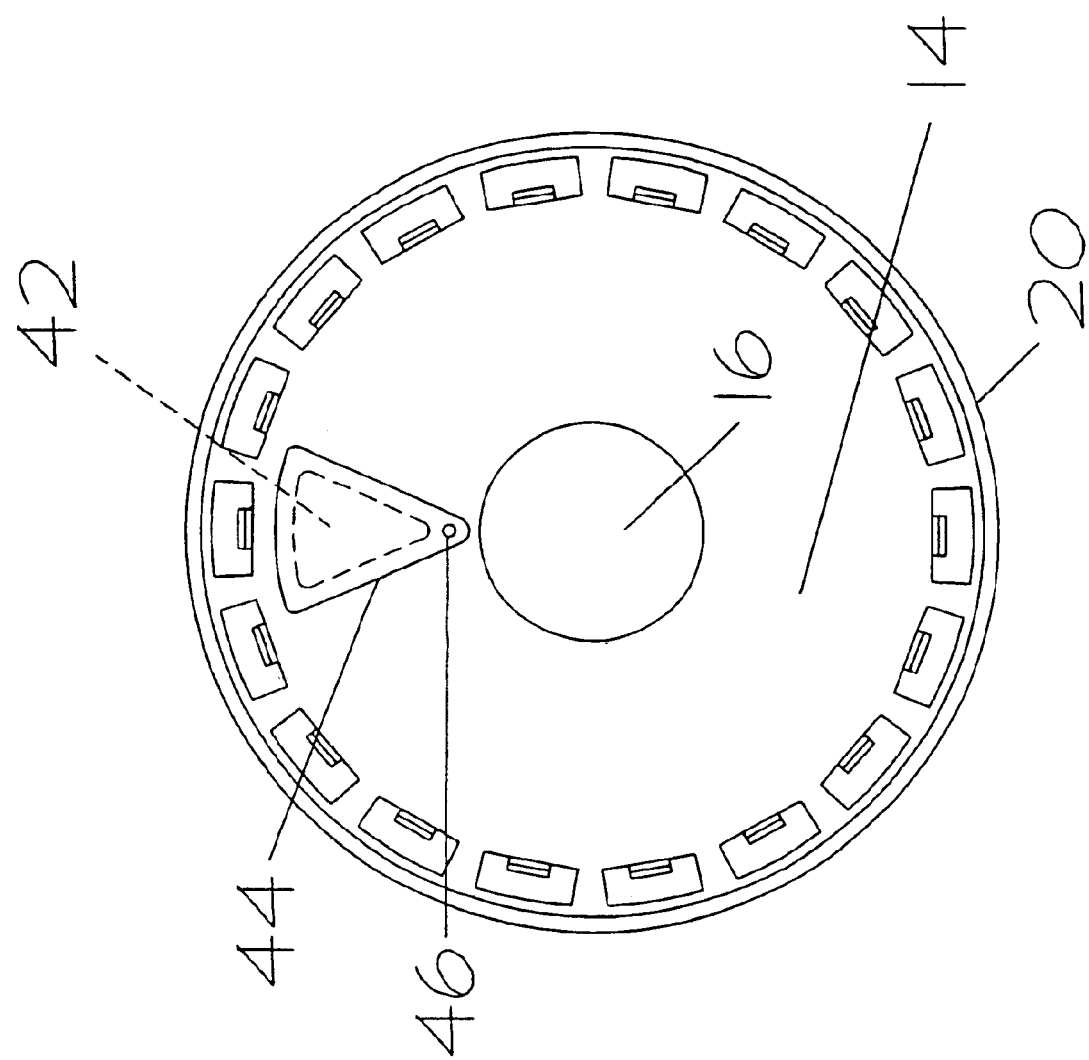

US 6,758,131 B1

ADJUSTABLE COVER

BACKGROUND OF THE INVENTION

1. Field of the Invention

The present invention relates to an adjustable cover or a lid having a variable outside diameter for covering food and the like, and more particularly to an adjustable food cover wherein the outside diameter of the cover can self-adjust to cover food on different sizes of pots, pans and plates.

2. Description of the Related Art

Covers and lids for pots and pans are generally formed of one size to suit a particular pot or pan. In many cases these are flat covers or lids suitable for pots and pans, but not necessarily suitable for covering food on plates as they do not provide space for the food. Plate covers used to keep food hot are generally of one shape and have vertical or sloped sides with a flat or domed top to contain the food on a plate. These covers are not adjustable for different sized plates.

Splatter shields are known for food. One example is shown by Vineisus in U.S. Design Pat. No. 381,863 issued Aug. 5, 1997. Such a shield design for food has a ring of leaves or vanes hinged to a top disc attached to a hand mixer. The leaves move up and down together to cover a bowl. The outside diameter of the shield does not vary substantially as the leaves have little curvature and thus do not form into a dome like shape.

Colanders and vegetable steamers which have a ring of overlapping moveable leaves hinged to a base are known. Examples of these are shown by Millard in U.S. Pat. No. 2,667,117 issued Jan. 26, 1954 and by Feld in U.S. Pat. No. 4,138,939 issued Feb. 13, 1979. Both of these patents relate to steamers or colanders but do not provide a cover that is adjustable to suit different sizes of plates, pots or pans.

BRIEF SUMMARY OF THE INVENTION

In is accordingly an object of the present invention to provide an adjustable lid or cover having a dome like shape, wherein the outside diameter can be varied to suit different sizes of pots, pans or plates. Such a cover may be used while cooking food in frying pans to prevent splatter and also to retain moisture in the food. The cover self-adjusts to fit into different sizes of pots or pans. Furthermore such a cover may be used over plates to keep food warm and again to prevent moisture from escaping from the food. The adjustable cover of the present invention has a variable outside diameter and comprises in combination a circular nonporous top member with a plurality of apertures adjacent a peripheral rim of the top member. The apertures are evenly spaced apart in a circle concentric with the peripheral rim with each of the apertures having a tongue projecting radially outwards therefrom. A number of non-porous substantially trapezoidal vanes are provided extending down from the peripheral rim of the top member, the vanes being curved and circumferentially overlapping in a ring to form a dome like shape. Each of the vanes has a tab projecting upwards into one of the apertures and resting on the surface the top member, the tab has a slot to engage the tongue in each of the apertures and hold the vanes to the top member in a circular overlapping ring arrangement. Adjacent vanes contact each other and the tongue and slot form a hinge for each of the vanes so they move up or down together retaining the circular overlapping ring arrangement, thus varying the outside diameter of the cover.

In other embodiments the cover includes a handle which may be insulated and also the cover includes vanes and top member formed of nonconductive material to retain heat underneath.

BRIEF DESCRIPTION OF THE DRAWINGS

The present invention will be more readily understood from the following description of the preferred embodiment thereof given by way of example with reference to the accompanying drawings, in which

FIG. 10 shows a top view of another embodiment of an adjustable cover with an adjustable vent area.

DESCRIPTION OF THE PREFERRED EMBODIMENT

Figure 1:
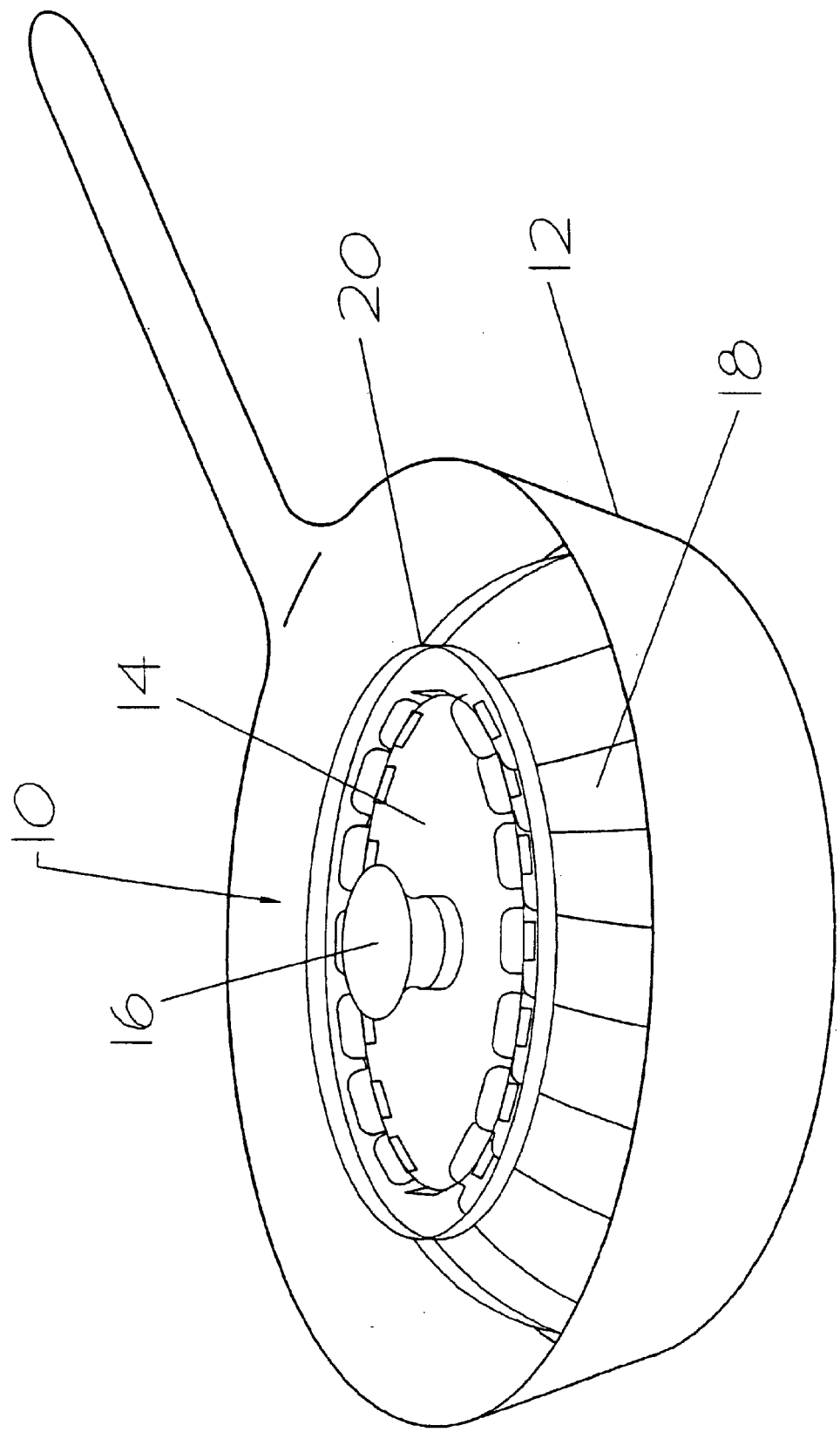
FIG. 1 shows a perspective view of an adjustable cover according to the preferred embodiment of the present invention positioned within a pan.
Figure 2:
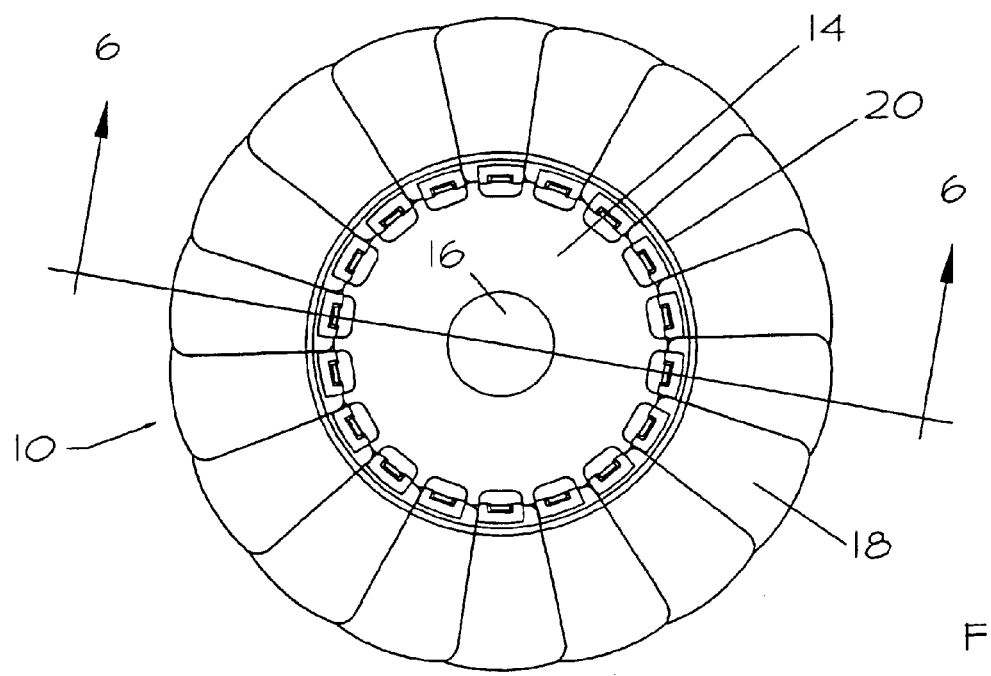
FIG. 2 shows a top view of the adjustable cover of FIG. 1.

An adjustable cover 10 is shown in FIG. 1 positioned in a frying pan 12. The cover 10 has a circular nonporous top member 14 with a knob or handle 16 placed at the center thereof. The knob or handle 16 is preferably formed of a nonconductive material such as wood, plastic or other suitable material. Surrounding the top member 14 is a plurality of nonporous substantially trapezoidal vanes 18 extending down from a peripheral rim 20 of the top member 14 as will be explained hereafter. The vanes 18 are curved and circumferentially overlap adjacent vanes in a ring to form a dome like shape. Adjacent vanes 18 contact each other and each vane is hinged to the peripheral rim 20 of the top member 14 so that the exteriors of the vanes form a variable diameter to self-adjust and fit in the base of the pan 12. Whereas the top member 14 is shown as being flat, it may alternatively be domed to permit a greater space within the cover 10.

Figure 3:
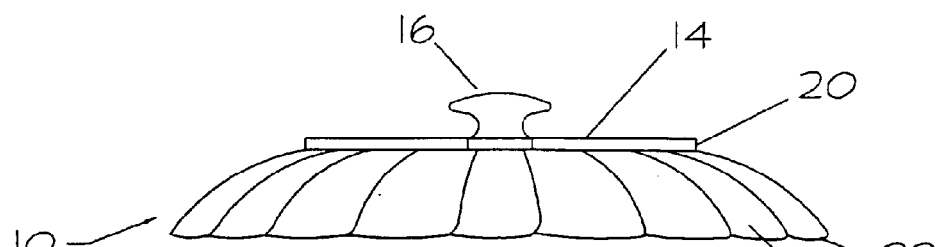
FIGS. 3, 4 and 5 show side views of the adjustable cover of FIG. 1 with variable outside diameters.
Figure 4:
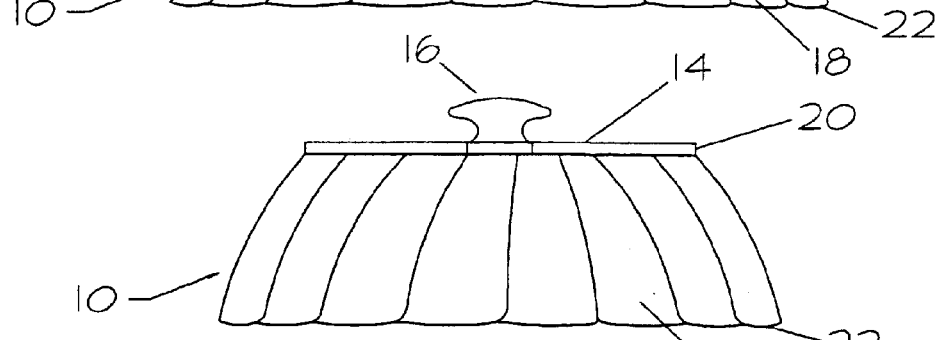
Figure 5:
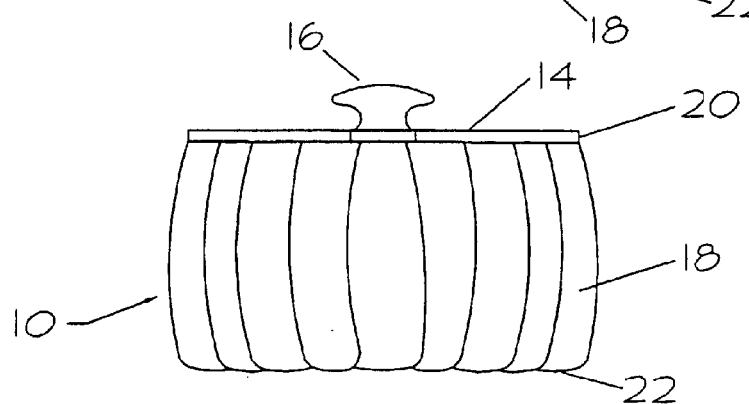

The arrangement of the vanes 18 is shown more clearly in FIGS. 2 to 6. The hinged vanes 18 overlap each other and contact each other in a concentric ring arrangement. The overlapping feature provides some friction between the overlapping vanes 18 to hold them in the desired position. FIGS. 3, 4 and 5 show the adjustable cover 10 having three different outside diameters at the tips 22 of the vanes 18. FIG. 3 shows the widest diameter, FIG. 4 medium and FIG. 5 the smallest diameter. By pushing down on the knob 16 the vanes 18 open to increase the outside diameter of the cover 10 and thus fit to a particular pan, pot or plate as will be seen in FIGS. 3, 4 and 5. When the cover has the largest outside diameter it is at the shallowest position, and conversely when at the smallest diameter the cover has more depth. By pushing the vanes inwards, the outside diameter of the cover decreases.

Figure 6:
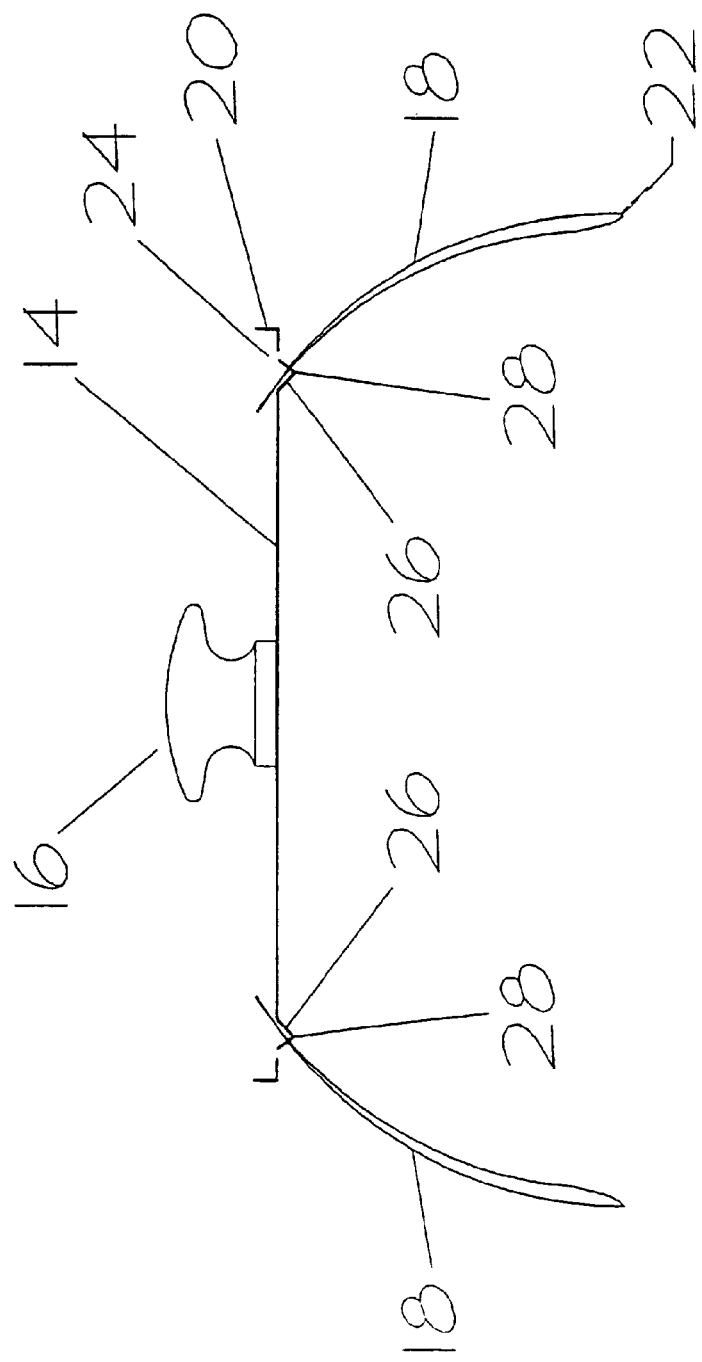
FIG. 6 shows a sectional view taken at line 6—6 of FIG. 2.
Figure 7:
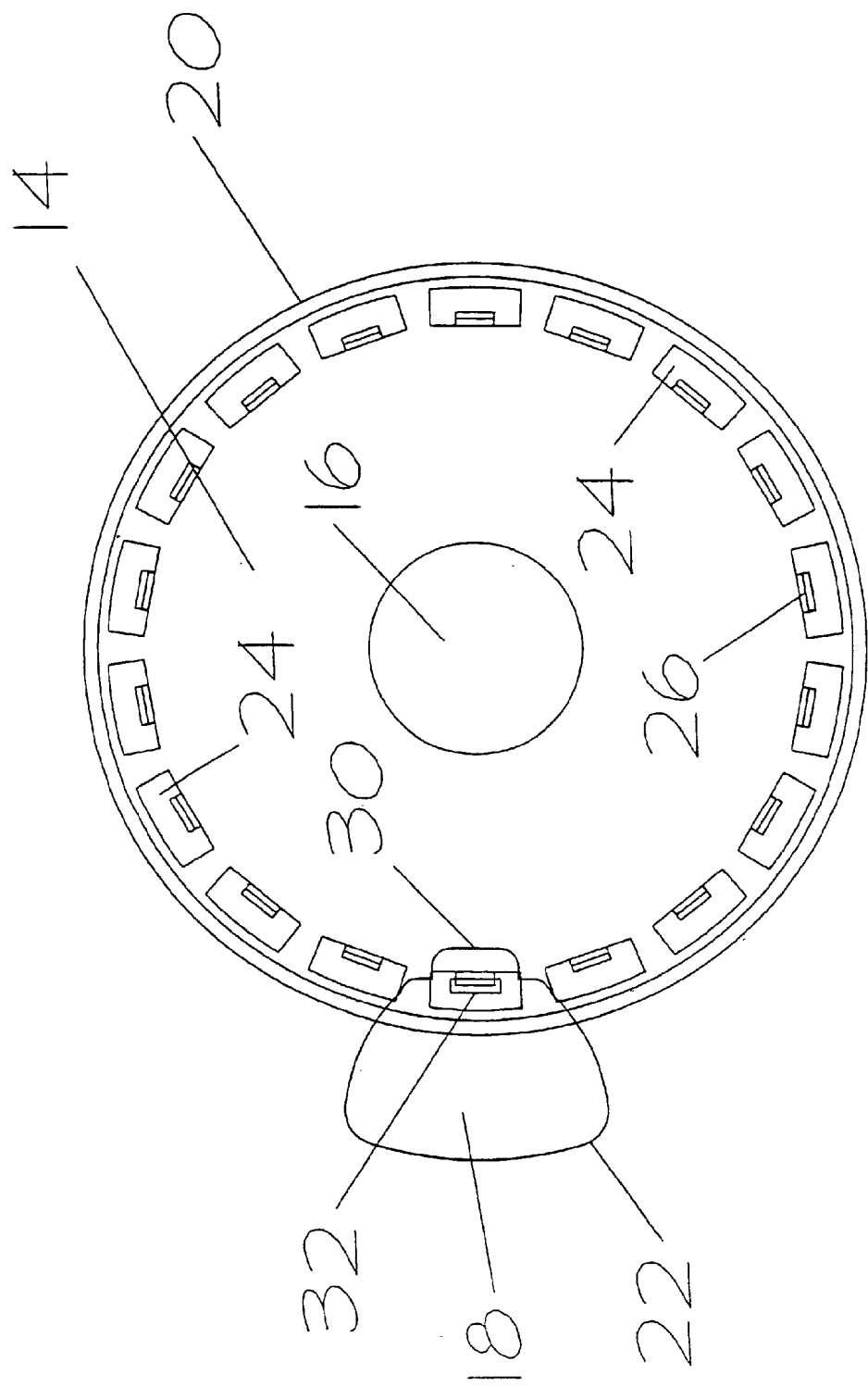
FIG. 7 shows a top plan view of a top member of the adjustable cover of FIG. 1 with one trapezoidal vane in place.
Figure 8:
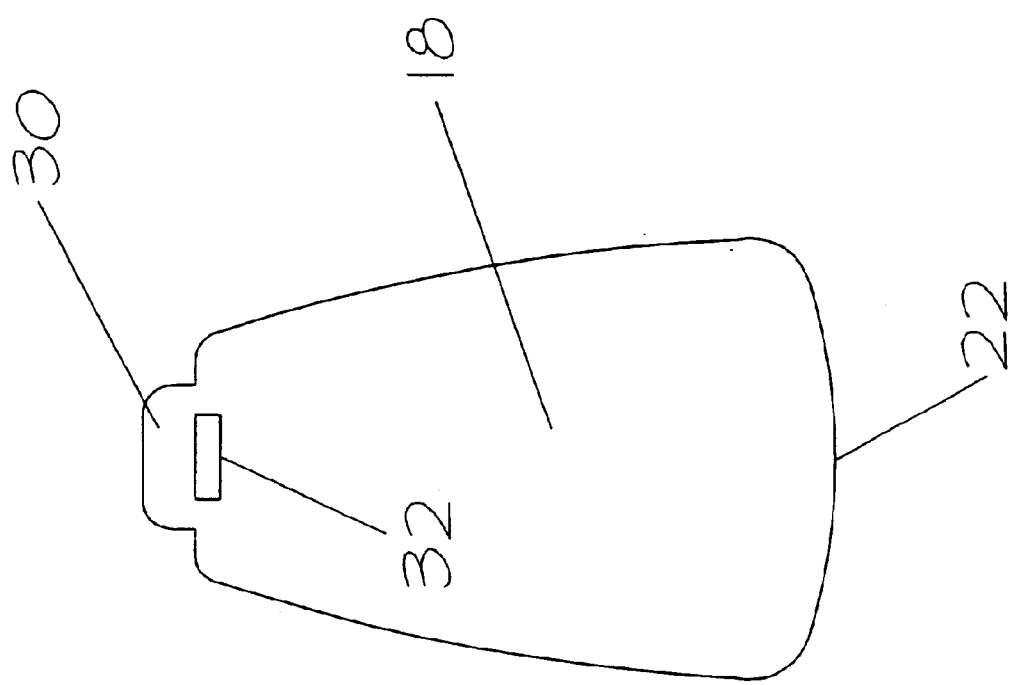
FIG. 8 shows an elevational view of a trapezoidal vane for the adjustable cover of the present invention.

Details of the connection between the vanes 18 and the top member 14 are shown more clearly in FIGS. 6, 7 and 8.

FIG. 7 shows a top member 14 with only one vane 18 positioned at the peripheral rim 20. There is a plurality of apertures 24 equally spaced apart in a circle concentric with the peripheral rim 20. Each of the apertures 24 has a tongue 26 at the approximate center projecting radially outwards from the top member 14 and having notch 28 therein as may be seen in FIG. 6. Each of the vanes 18 is substantially trapezoidal in shape and is curved in both a horizontal and vertical plane so that when the vanes are in position they form a dome like shape. As may be seen in FIG. 8 each vane 18 has a tab 30 at the top to fit within the aperture 24 in the top member 14 as may be seen in FIG. 7. The tab has a slot 32 which engages with the tongue 26 and is held in place by the notch 28 so that each vane 18 can pivot upwards or downwards to thus change the angle between the center of the top member 14 and the tip 22 of the vane 18. When all the vanes 18 are attached to the top member 14, they overlap each other circumferentially in a ring and movement of one vane 18 increases or decreases the outside diameter. The overlapping vanes 18 contact each other to cause friction which holds the vanes 18 at a desired position for different diameters. Movement of one vane 18 results in all the vanes moving together.

As the vane edges overlap each other, they preferably make contact for the length of the vane 18 and thus prevent splatter or moisture escaping from inside the cover. Also they retain heat within the cover when the adjustable cover is used for keeping food hot on plates and platters.

Figure 9:
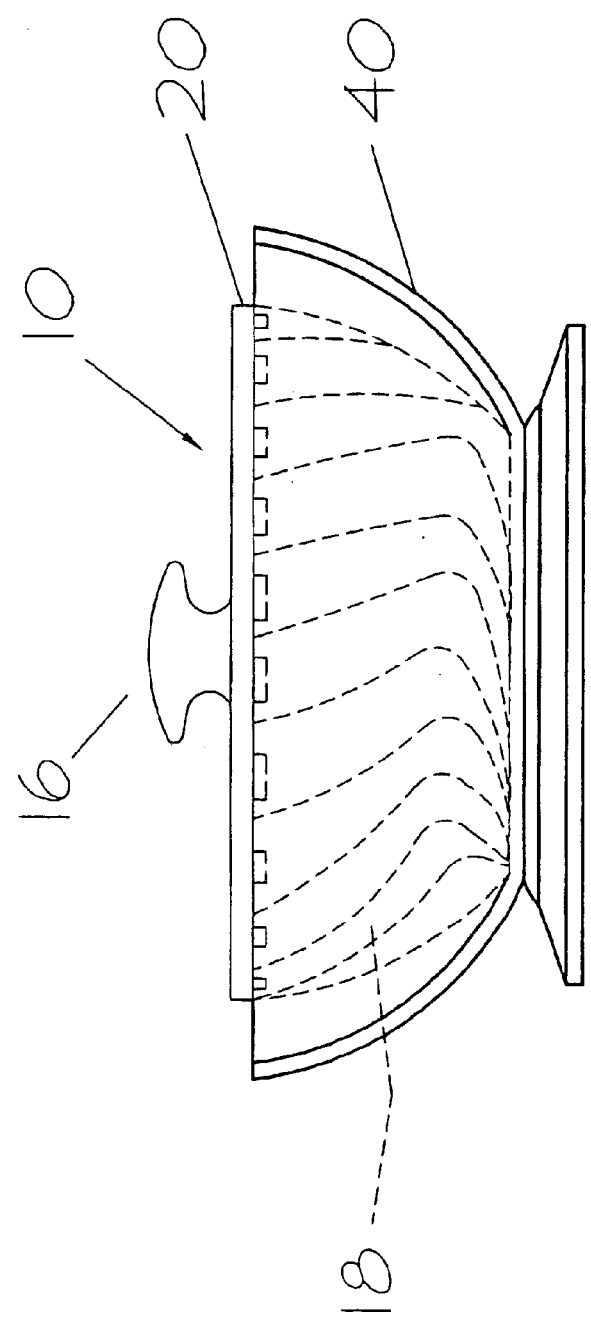
FIG. 9 shows a side view of the adjustable cover of FIG. 1 positioned in a bowl.

FIG. 9 illustrates the adjustable cover 10 with the vanes 18 collapsed inwards resting in a bowl 40 which may be placed on a stove top or work area The use of a bowl 40 prevents spillage as condensation and other liquids are contained in the bowl 40. The vanes 18 are pushed inwards so they collapse, closing up the cover 10 to fit into a suitable bowl 40.

In another embodiment, a vent area 42 is provided in the circular nonporous top member 14. The vent area 42 is shown having a sector shape and has a sector shaped vent plate 44 with a pivot pin 46 towards the center of the top member 14. The vent plate 44 can be pivoted to open the vent area 40 when it is desired to permit condensation and the like to escape. The position of the vent plate can be varied to adjust the size of the vent area 42.

In another embodiment, which is not shown in the drawings, the vent plate slides in guides over the vent area 42.

The vanes 18 and top member 14 are preferably made of sheet metal and are corrosion resistant. The adjustable cover 14 may be used in any cooking areas and is washable. The sort of material used is similar to that used in expandable steamers or colanders but does not have holes therein, as the purpose of the adjustable cover is to retain moisture and heat under the cover and prevent splatter.

In another embodiment the top member 14 and vanes 18 are formed of a nonconductive material such as plastic which is resistant to high heat. Such a material will act as a better insulator than metal and thus retain the heat under the cover. Such a cover may also be made of non-conductive material that can be used in a microwave oven.

Various changes may be made to the embodiments shown herein without departing from the scope of the present invention which is limited only by the following claims.

I claim:

1. An adjustable cover having a variable outside diameter, comprising in combination:
    a circular nonporous top member having a plurality of apertures adjacent a peripheral rim of the top member, the apertures evenly spaced apart in a circle concentric with the peripheral rim, each of the apertures having a tongue projecting radially outward therefrom;
    a plurality of nonporous substantially trapezoidal vanes extending down from the peripheral rim, the vanes being curved and circumferentially overlapping to form a dome like shape, each of the vanes having a tab projecting upwards into one of the apertures and resting on the surface of the top member, the tab having a slot to engage the tongue and each of the apertures and hold the vanes to the top member in a circular overlapping ring arrangement and adjacent vanes contacting each other, the tongue and slot forming a hinge for each of the vanes so that the vanes move up or down together retaining the circular overlapping arrangement to vary the outside diameter of the cover.

2. The adjustable cover according to claim 1 including a handle on the top member.

3. The adjustable cover according to claim 2 wherein the handle is insulated and in the center of the top member.

4. The adjustable cover according to claim 1 wherein the vanes and top member are formed of nonconductive material.

5. The adjustable cover according to claim 1 wherein a vent area is provided in the top member.

6. The adjustable cover according to claim 5 wherein a vent plate is provided to vary the vent area from an open to a close position.

* * * * *